United States Patent [19]

Callahan et al.

[11] Patent Number: 4,976,867

[45] Date of Patent: Dec. 11, 1990

[54] SYSTEMS AND METHODS FOR PREDETERMINING MAXIMUM PRESSURE DIFFERENTIALS FOR MICROPOROUS HOLLOW FIBERS EMPLOYED IN LIQUID-LIQUID EXTRACTIONS

[75] Inventors: Robert W. Callahan, Charlotte; Bradley W. Reed, Gastonia, both of N.C.

[73] Assignee: Hoechst Celanese Corporation, Somerville, N.J.

[21] Appl. No.: 333,410

[22] Filed: Apr. 5, 1989

[51] Int. Cl.⁵ .............................................. B01D 65/10
[52] U.S. Cl. ............................... 210/637; 210/745; 210/85
[58] Field of Search ................. 210/637, 741, 745, 85, 210/96.1, 96.2, 634; 73/38, 40.7

[56] References Cited

U.S. PATENT DOCUMENTS

| 4,188,817 | 2/1980 | Steigelmann | 73/40.7 |
| 4,405,688 | 9/1983 | Lowery et al. | 428/398 |
| 4,541,981 | 9/1985 | Lowery et al. | 264/209.1 |
| 4,789,468 | 12/1988 | Sirkar | 210/137 |

Primary Examiner—Frank Spear
Attorney, Agent, or Firm—K. A. Genoni; B. H. Davidson; J. M. Brown

[57] ABSTRACT

Systems and methods for predetermining maximum pressure differentials for particular microporous hollow fiber membranes and essentially immiscible feed and extractant liquids to be employed in liquid-liquid extractions include a test module having a number of such fibers formed into a loop between the opposing ends thereof. A tubular sleeve element encompasses these opposing ends, and a potting compound positionally retains the opposing ends within the tubular sleeve. The hollow fiber lumens are fluid-connected to a reservoir containing a pressurized feed liquid, and the loops of hollow fiber are immersed in an essentially unpressurized extractant liquid. The pressure of the feed liquid is continually increased until there is an incipient presence of the feed liquid in the extractant liquid. The pressure of the feed liquid at that incipient presence may therefore be used to calculate a maximum pressure differential tolerated by the microporous hollow fibers for the feed and extractant liquids used. The system which detects the incipient presence may also be associated with full scale liquid-liquid extraction modules so that malfunctions and/or module failures may be determined.

17 Claims, 4 Drawing Sheets

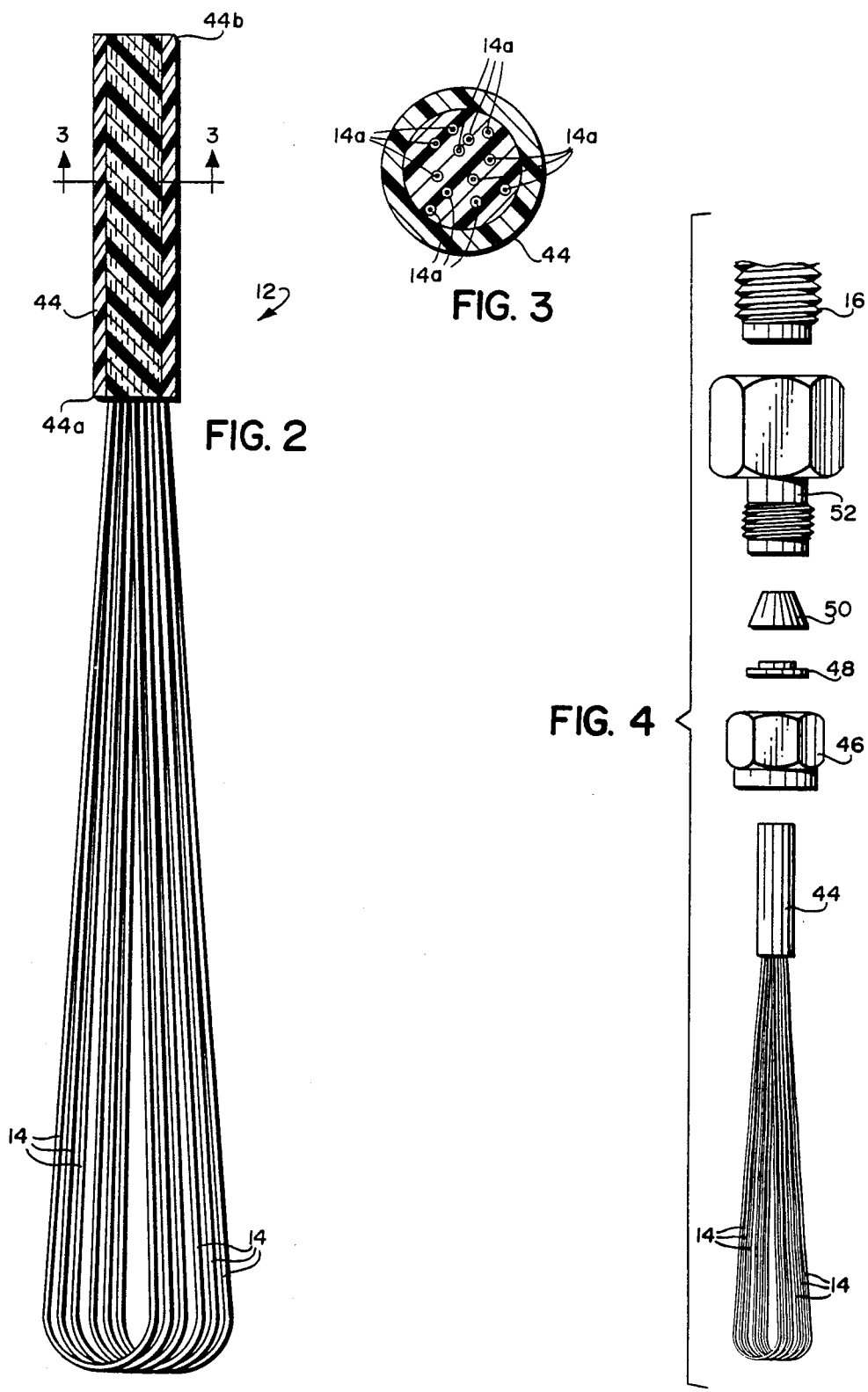

SYSTEMS AND METHODS FOR PREDETERMINING MAXIMUM PRESSURE DIFFERENTIALS FOR MICROPOROUS HOLLOW FIBERS EMPLOYED IN LIQUID-LIQUID EXTRACTIONS

FIELD OF THE INVENTION

This invention generally relates to the field of liquid-liquid extractions—that is, techniques for transferring a solute from a feed liquid to an extractant liquid which is essentially immiscible in the feed liquid. More particularly, the invention relates to test systems and methods employing microporous hollow fibers whereby maximum pressure differentials across the hollow fibers for any given feed and extractant liquids can be predetermined. These pressure differential predeterminations may then be used as a means to establish the pressures of the feed and extractant liquids for a full scale commercial liquid-liquid extraction system employing similar microporous hollow fibers. The invention also relates to means which detect the presence of the essentially immiscible feed liquid in a stream of the extractant liquid in a liquid-liquid extraction system so that extraction module failure and/or malfunction can readily be determined.

BACKGROUND AND SUMMARY OF THE INVENTION

Microporous membranes possess a number of desirable physical attributes—e.g.,their extremely small pore sizes, gas and liquid permeability, chemical stability, nontoxicity, mechanical strength, and the like—that are useful in many end-use applications. For example, microporous membranes have been employed in blood oxygenation systems, liquid-liquid extraction systems, and microfiltration systems, to name just a few.

U.S. Pat. No. 4,789,468 issued on Dec. 6, 1988 to Sirkar (the entire content of which is expressly incorporated hereinto by reference), discloses a liquid-liquid extraction system which utilizes microporous membranes. In this regard, the system disclosed in this patent relies upon an interface-immobilizing pressure difference effective to prevent the feed liquid from flowing through the micropores of the membrane and dispersing in the extractant liquid on the opposite side of the membrane.

However, as is recognized in U.S Pat. No. 4,789,468, the range of pressure differences effective to immobilize the interface between particular liquids depends on a number of factors, including the physical properties of the liquids employed (e.g., their respective abilities to "wet" the membrane, the interfacial tension between the liquids, and the flow characteristics of the liquids at the surface of the membrane), and the physical attributes of the membranes employed (e.g., the effective size of the membrane pores), which cannot in general be predicted. In this regard, please refer to column 2, line 48 through column 3, line 12 of U.S. Pat. No. 4,789,468.

It might be envisioned, based upon U.S. Pat. No. 4,789,468, that the range of pressure differences for any selected liquids and/or membranes may be predetermined using commercial scale liquid-liquid extraction modules. That is, the range of pressure differences for any selected liquids and/or membranes may be predetermined simply by running tests using full scale liquid-liquid extraction modules so as to establish a maximum pressure difference that can be tolerated by the full scale module. It would, however, clearly be more advantageous if the full scale commercial module could be dedicated to performing only liquid-liquid extractions and thus not employed for any physical testing of the liquids and/or hollow fibers. Thus, it would be highly desirable if the unknowns for any given liquid and/or hollow fiber membrane in a liquid-liquid extraction system could be predetermined using a laboratory bench scale system. It is towards providing such a laboratory bench scale system that the present invention is directed.

According to one aspect of this invention, disposable microporous hollow fiber (sometimes referred to hereinafter simply as "MHF") test modules are provided which include a number of microporous hollow fiber membranes formed into a loop such that opposing ends of the fibers are adjacent to one another. These opposing ends are then positionally retained (e.g., via a suitable potting compound) within a tubular sleeve. The test module may then be coupled operatively to a source of pressurized feed liquid so that the lumens at the adjacent opposing ends are fluid-connected to the same. The loops of MHF are immersed in essentially unpressurized (i.e., at atmospheric pressure) extractant liquid.

The pressure of the feed liquid may then gradually be increased until an incipient presence of the feed liquid appears in the essentially unpressurized extractant liquid. This incipient presence will therefore establish a maximum pressure difference that can be tolerated using the particular feed and extractant liquids and the particular MHF under investigation. As can be appreciated, different feed liquids, extractant liquids, and/or MHF may be investigated simply by providing a "fresh" test module having the desired MHF to be investigated and then operating the system with the desired feed and extractant liquids to be investigated as discussed above. In such a manner, a number of different liquid and/or MHF candidates for liquid-liquid extractions may be screened quickly so that more optimum usage of full scale commercial MHF liquid-liquid extraction modules is realized.

On-line detection of the presence of the essentially immiscible feed liquid in an extractant liquid stream of a liquid-liquid extraction system is also provided by this invention. By detecting the presence of the feed liquid i the extractant liquid on line, any failures and/or malfunctions of a liquid-liquid extraction module employing microporous hollow fibers may quickly be determined so that remedial action can be taken.

These and other aspects and advantages of the invention will become more clear after careful consideration is given to the following detailed description of the preferred exemplary embodiments.

BRIEF DESCRIPTION OF THE ACCOMPANYING DRAWINGS

Reference will hereinafter be made to the accompanying drawings wherein like reference numerals throughout the various FIGURES denote like structural elements, and wherein;

FIG. 2 is an enlarged view, partly in cross-section, of an exemplary microporous hollow fiber test module employed in the system shown in accompanying FIG. 1;

FIG. 3 is a cross-sectional view of the module shown in FIG. 2 as taken along line 3—3 therein;

FIG. 4 is an exploded elevational view showing a preferred means for coupling the microporous hollow fiber test module to the system shown in FIG. 1;

DETAILED DESCRIPTION OF THE PREFERRED EXEMPLARY EMBODIMENTS

Figure 1:
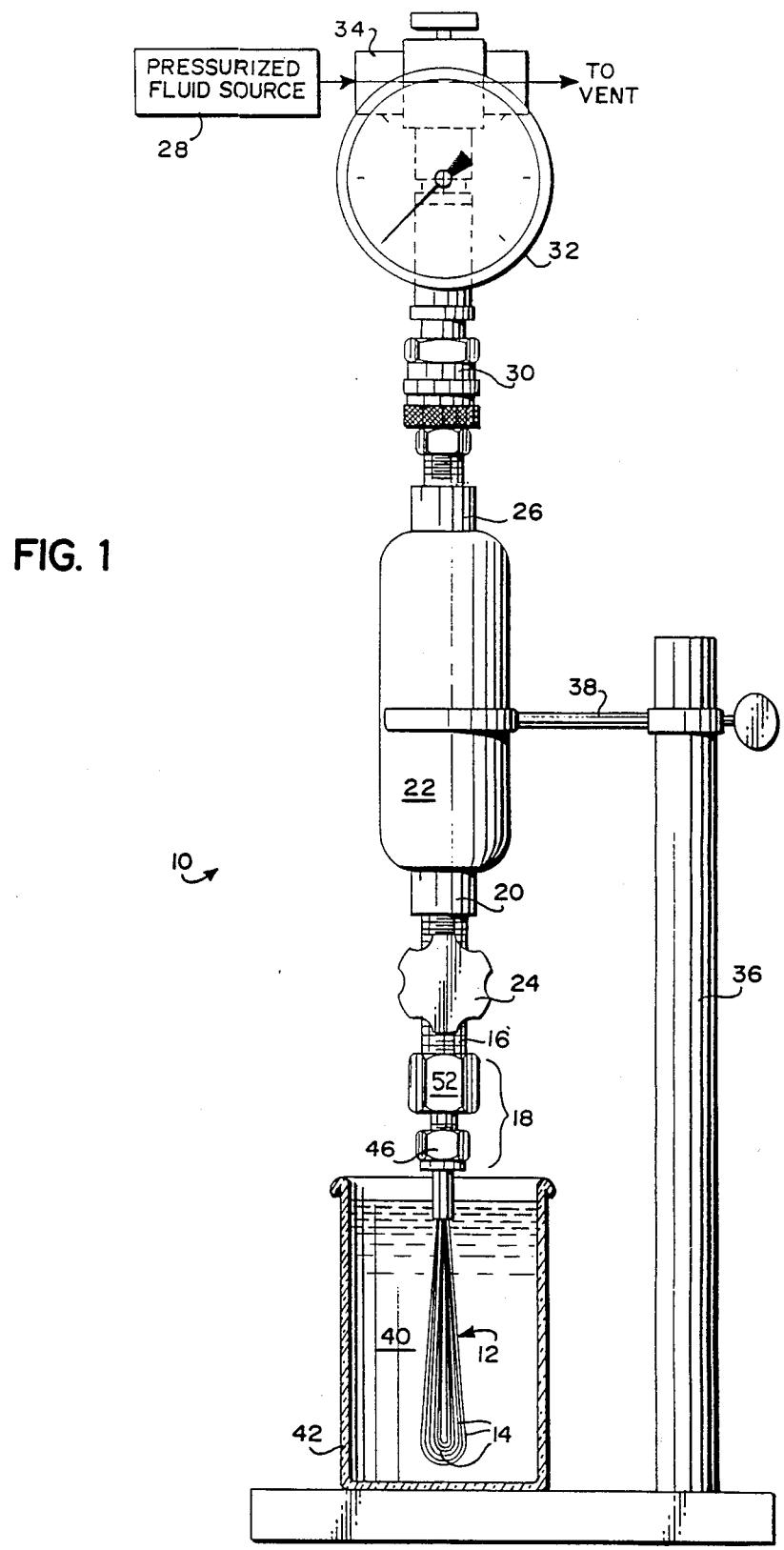
FIG. 1 is an elevational view of a test system according to this invention which simulates a liquid-liquid extraction device and which allows the maximum pressure differential for given feed liquids, extractant liquids and microporous hollow fiber membranes to be predetermined.

A particularly preferred test system 10 according to this invention is shown in accompanying FIG. 1 as having a test module 12 which includes a number of microporous hollow fibers 14 in the form of continuous loops. As is seen, the test module 12 is fluid-connected to a distal end of a threaded conduit 16 via a coupling 18. The proximal end of the conduit 16 is fluid connected to an outlet 20 of a fluid reservoir 22. In such a manner, the lumens of the microporous hollow fiber loops 14 of the test module 12 are in fluid communication with a selected feed liquid within the reservoir 22 (as will be discussed in greater detail below). An isolation valve 24 is preferably in operative association with the conduit 16 so that the hollow fiber loops 14 may be fluid isolated from the feed liquid in reservoir 22 (e.g., so as to allow one test module 12 to be removed from the system 10 and replaced with another test module 12).

The inlet 26 of the reservoir 22 is fluid-connected to a source of pressurized fluid 28 (e.g., pressurized air or nitrogen) through an inlet conduit 30, a pressure indicator 32, and a three-way valve 34. The system 10 may be maintained upright by means of a standard laboratory stand 36 and conventional beaker clamp 38.

The hollow fiber loops 14 are immersed within a selected extractant liquid 40 held by a container 42. The container 42 is preferably a glass beaker so that the incipient presence of feed liquid expelled through the pores of the fiber loops 14 into the extractant liquid 40 (which incipient presence is indicative of a maximum pressure differential across the walls of the fiber loops for the particular feed liquid, extractant liquid and MHF employed) can visibly be discerned. Since the container 42 is open to the surrounding environment, the pressure of the liquid 40 is atmospheric (i.e., essentially unpressurized).

For some end-use applications, it may be desirable to pressurize the liquid 40 so as to, for example, predetermine the minimum pressure required within the lumens of the microporous hollow fibers so as prevent entry of the pressurized liquid 40. In such a situation, a suitable pressure vessel will contain the liquid 40 and will be sealed around the conduit 16.

Accompanying FIGS. 2-3 show a particularly preferred test module 12 according to this invention in greatly enlarged views for clarity of presentation. As previously discussed, the test module 12 includes a number of microporous hollow fiber loops 14, the opposite ends 14a of each being adjacent to one another as is shown more clearly in FIG. 3. These adjacent ends 14a are received within a tubular sleeve 44 and are positionally retained therewithin via potting compound 46 (e.g., a suitable adhesive, such as an epoxy or a polyurethane adhesive) which fills the interior space of the tubular sleeve 44. The microporous hollow fiber loops 14 will therefore extend from the distal end 44a of the sleeve 44, while the lumens of the adjacent ends 14a will be open at the proximal end 44b of sleeve 44.

The sleeve 44 may be formed of any suitable material. However, for purposes of ensuring a tight seal when the test module 12 is coupled to the system 10, it is preferred that the sleeve 44 be formed of a resin material (e.g., nylon).

Any suitable microporous hollow fiber membrane may be utilized in the test module 12 of this invention. Preferably, the microporous hollow fibers will be polyolefinic (e.g., polypropylene or polyethylene). Most preferred, however, are the microporous hollow fiber membranes of the type disclosed in U.S. Pat. Nos. 4,405,688 and 4,541,981 (the entire content of each being expressly incorporated hereinto by reference). Microporous hollow fiber membranes of the type disclosed in these patents are commercially available from Hoechst Celanese Corporation, Separations Products Division of Charlotte, N.C., under the registered trademark CELGARD ®.

The test module 12 may be operatively coupled to the distal end of conduit 16 in the manner shown in FIG. 4. As is seen, the sleeve 44 is inserted sequentially through a female connector 46, a ferrule 48, a conical seal element 50 and a male connector 52. The male connector 52 is threadably coupled onto the distal end of conduit 16 while the female connector 46 is threadably coupled onto the male connector 52 (see also FIG. 1), with the ferrule 48 and conical seal element 50 being positioned between and within these connectors 46 and 52.

With the sleeve 44 positioned within the male connector 52, the female connector 46 may then threadably be tightened onto the male connector 52. This will, in turn, cause the ferrule 48 to be urged into contact with the conical seal 50 so as to form a fluid-tight seal around the periphery of the sleeve 46. The coupling 18 (i.e., having the female connector 46, ferrule 48, conical seal 50 and male connector 52) is well known per se and is commercially available from the Crawford Fitting Company under the registered trademark SWAGE-LOK ®. Other coupling means may be employed, however, without departing from the present invention.

In use, a test module 12 will be coupled to the distal end of the conduit 16 in the manner described above. At this time the valve 24 is closed. The test module 12 will have microporous hollow fibers of a selected material and/or pore size. The fiber loops 14 will be immersed into the liquid 40 (which is a desired extractant liquid to be investigated for possible use in a liquid-liquid extraction system) within the container 42. The reservoir 22 will contain a desired feed liquid under investigation for use in a liquid-liquid extaction system. For example, the feed liquid may be a liquid having a solute specie to be extracted during a liquid-liquid extraction employing the microporous hollow fibers of the type represented by the test module 12.

The feed liquid within the reservoir 22 and the extractant liquid 40 within the container 42 may be either aqueous or organic, provided that the feed liquid is essentially immiscible in the extractant liquid. The extractant liquid 40 is selected for its ability to preferentially wet the microporous hollow fiber (i.e., its ability to occupy the micropores of the MHF membrane) as compared to the membrane wetting ability of the feed liquid.

The valve 34 is then operated so that the source of pressurized fluid is fluid-connected to the reservoir 22. At this time, the valve 24 is open so that the liquid within the reservoir 22 fills the lumens of the hollow fiber loops 14 (i.e., since the lumens of the hollow fiber loops are in fluid communication with the liquid in the reservoir 22 via the conduit 16). The pressure of the pressurized fluid may then gradually be increased at periodic time intervals (for example, 5 psi every 15–30 seconds) as by means of a pressure control valve (not shown) upstream of the valve 34.

The periodically increased pressure of the feed liquid will therefore gradually force the feed liquid into the micropores of the MHF membrane and thus tend to gradually displace the extractant liquid therefrom (i.e., since the extractant liquid preferentially wets the micropores of the MHF membrane). A maximum pressure of the feed liquid will therefore eventually be reached for any given feed liquid, extractant liquid and MHF membrane whereby the feed liquid "breaks through" the membrane wall—that is, the feed liquid is forced through the micropores of the MHF membrane and into the extractant liquid 40 surrounding the exterior of the MHF membrane loops 14.

Since the feed liquid is essentially immiscible in the extractant liquid, its break-through will visually be apparent by a number of immiscible feed liquid droplets in the extractant liquid 40 within the container 42. At this time, the gauge pressure indicated on the pressure gauge 32 is noted. This gauge pressure is therefore the maximum pressure difference tolerated by the MHF membrane for the feed and extractant liquids employed since the extractant liquid is at atmospheric pressure. Therefore, a full scale liquid-liquid extraction module having microporous hollow fiber membranes similar to those used in the module 12 can be operated without liquid break through provided that the pressure difference between the feed and extractant liquids is maintained below the maximum pressure differential which was predetermined by means of the test system described above.

The visual appearance of feed liquid "break-through" into the extractant liquid 40 may be enhanced by incorporating an inert visible tracer (e.g. a dye compound) in the feed liquid. The tracer must, of course, be soluble in the particular feed liquid under investigation. By providing a feed liquid within reservoir 22 which has a visible tracer, the incipient presence of the feed liquid expelled through the pores of the MHF loops 14 into liquid 40 will be more readily perceived.

After testing, the valve 24 may be closed and a fresh module 12 inserted into the coupling 18. The valve 34 is also manipulated so as to close fluid-communication between the source 28 and the reservoir 22 and open fluid-communication between the reservoir 22 to vent. The reservoir 22 may also be emptied of the feed liquid employed in the previous test and refilled with a different liquid, if desired. Similarly, a different extractant liquid 40 may be provided in the container 42. As will be appreciated, by means of the present invention, a number of liquid and/or hollow fiber candidates for full scale liquid-liquid extraction systems may quickly be screened on a laboratory bench scale (i.e., without the need to employ a full scale module of the hollow fibers).

Figure 5:
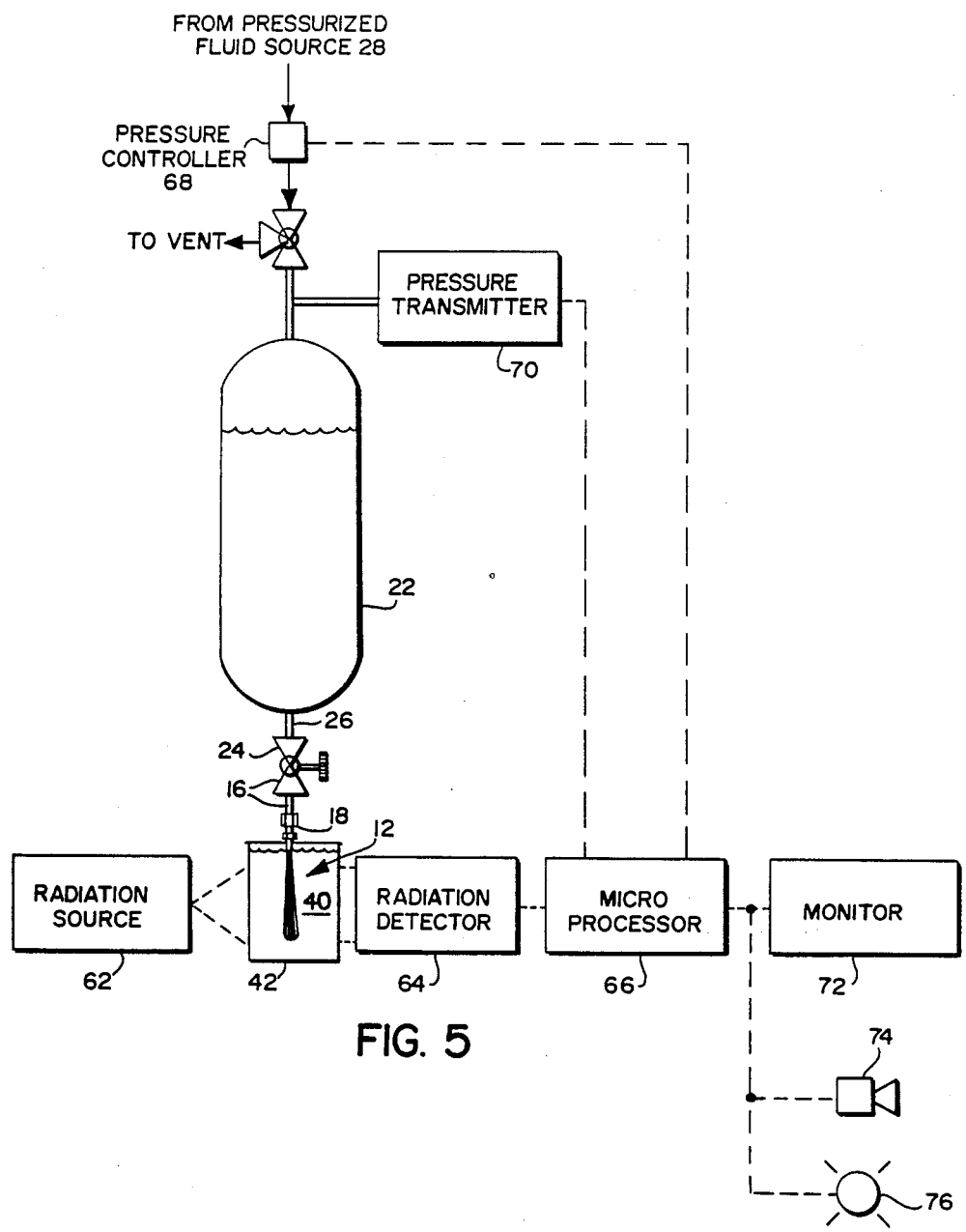
FIG. 5 is a schematic view of one possible automated test system according to the present invention.

A preferred automated system 60 according to this invention which employs the test module 12 is shown schematically in accompanying FIG. 5. As is seen, the system 60, like the system 10 discussed previously, includes a test module 12 fluid-connected to the outlet end 20 of a liquid reservoir 22 via a coupling 18, conduit 16 and shut-off valve 24. A three-way valve 34 fluid connects the source of pressurized fluid 28 to the inlet 26 of the reservoir 22 and, alternately, is capable of fluid-connecting the reservoir 22 to vent.

A radiation source 62 (e.g., a light source) is positioned on one side of the container 42 while a radiation detector 64 (e.g. a photodetector) is positioned on the opposite side of container 42. The radiation detector 64 will thus sense a change in the radiation level passing through the liquid 40 and will output a signal to a microprocessor 66 in response to that sensed change. A change in the radiation level will therefore be indicative of the incipient presence of feed liquid "break-through" from the pores of the hollow fiber loops 14 into the liquid 40—that is, since a different optical property of the liquid 40 will ensue by virtue of the presence of the essentially immiscible feed liquid therein. This different optical property may further be enhanced by incorporating a visible tracer in the feed liquid within reservoir 22 as has been previously discussed.

The microprocessor 66 will output a control signal to a pressure controller 68 and will therefore periodically increase the pressure of the pressurized fluid supplied to the reservoir 22. This increased pressure will be sensed by the pressure transmitter 70 which supplies a signal indicative of the same to the microprocessor 66. This periodic increase in pressure continues until the detector 64 senses a change in the radiation level passing through the liquid 40 (which change is indicative of fluid "break-through") and issues a signal to the microprocessor 66. The microprocessor 66 will then calculate the maximum pressure differential and will output a signal indicative of the same to a suitable video monitor 72 where it may be displayed in human-readable form. The microprocessor 66 may alternately (or concurrently) issue a signal to an audible alarm 74 and/or a visual alarm 76.

Although the automated system 60 shown in accompanying FIG. 5 has been described in terms of a static test device, it should be appreciated that the detection means could be operatively associated with a full scale liquid-liquid extraction system (which might employ a number of serially connected hollow fiber membrane modules). That is, the "break-through" detection means shown in FIG. 5 could be employed in a dynamic liquid-liquid extraction system whereby a selected number of such "break-through" detection means is associated with selected liquid-liquid extraction modules. One such means is shown in accompanying FIG. 6.

Figure 6:
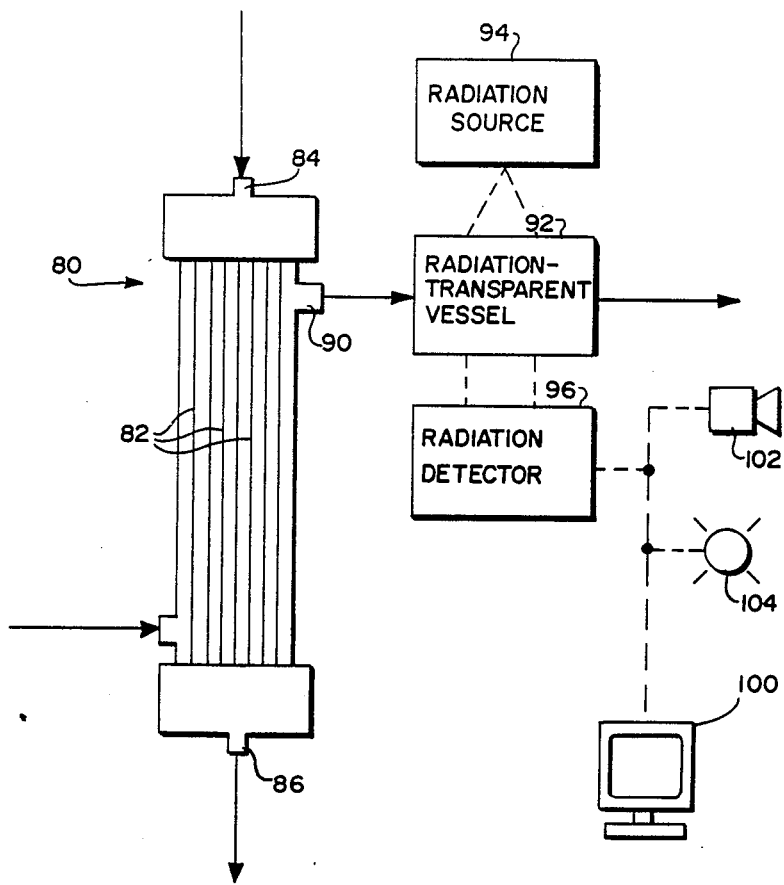
FIG. 6 is a schematic view of a system according to this invention which may be employed to detect the presence of the essentially immiscible feed liquid in an extractant liquid stream discharged from a liquid-liquid extraction module.

As is seen, a liquid-liquid extraction module 80 having a number of microporous hollow fiber membranes (a representative few of which are shown in FIG. 6 by reference numeral 82) is supplied at an inlet port 84 with a solute-containing feed liquid. Since the inlet port B4 is fluid-connected to the lumens of the hollow fiber membranes 82, it will pass therethrough and be discharged at the feed liquid discharge port 86. The essentially immiscible (but preferentially membrane-wettable) extractant liquid is introduced into the module 80 via port 88 and flows around the exteriors of the hollow fiber membranes 82, eventually being discharged from the module 80 at port 90. It will be appreciated that the extractant solution discharged from the port 90 will be solute-rich (i.e., since extraction of the solute from the feed liquid has occurred in the module 80).

According to this invention, the extractant liquid is introduced into a radiation-transparent vessel 92 (which may simply be a transparent conduit) through which radiation emitted by a radiation source 94 (e.g., a light source) passes. The radiation passing through the vessel 92 is detected by a radiation detector 96 (e.g., a photodetector).

The detector 96 will therefore sense a change in the "normal" level of radiation passing through the vessel 92, the change being indicative of the presence of feed liquid in the discharged extractant liquid (i.e., since a change in optical properties of the discharged extractant liquid stream will ensue due to the immiscibility of the feed and extractant liquids). This sensed change will therefore cause the detector 96 to output a signal to a suitable video monitor 100, and/or to suitable alarm means, such as an audible alarm indicator 102 or a visual alarm indicator 104. In such a manner, malfunctions and/or module failure (e.g., caused by ruptured hollow fiber membranes) may quickly be determined so that corrective action can be pursued.

As may now be appreciated, the present invention provides a suitable means for predetermining, on a laboratory bench scale, maximum pressure differentials for liquid-liquid extraction systems employing selected microporous hollow fibers and selected feed and extractant liquids. As such, a variety of candidate liquids and/or microporous hollow fibers may be screened for eventual use in a liquid-liquid extraction system without the need to use full scale hollow fiber modules. In addition, the present invention provides detection means for a dynamic liquid-liquid extraction system whereby the presence of the feed liquid in the essentially immiscible extractant liquid (which might be indicative of module failure and/or malfunction) can be sensed.

Therefore, while the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed:

1. A system comprised a test module including a number of microporous hollow fibers each defining a central lumen and formed into a loop such that opposing end portions thereof are adjacent to one another, and means for predetermining a maximum pressure differential at or above which a first liquid is forced out from micropores of said number of microporous hollow fibers and into a second liquid, essentially immiscible with the first liquid, which surrounds the microporous hollow fibers, wherein said means for predetermining said maximum pressure differential comprises:
    reservoir means having an inlet and an outlet and adapted to hold a predetermined volume of said first liquid;
    container means for holding a predetermined volume of said second liquid, wherein said loops of said hollow fibers are immersed in said second liquid held by said container means;
    pressurizing means coupled to said inlet of said reservoir means for pressurizing said first liquid within said reservoir means and allowing the pressure of said pressurized first liquid to be continually increased between a low pressure condition and a high pressure condition; and
    means for coupling said test module to said outlet of said reservoir means to thereby fluid-connect said lumens of said microporous hollow fibers with said second liquid in said reservoir; wherein
    a maximum pressure condition between said low and high pressure conditions allowed by virtue of said pressurizing means causes said first liquid to be forced out from said micropores of said microporous hollow fibers and into said immiscible second liquid in said container means, whereby said maximum pressure differential is determined.

2. A system as in claim 1, further comprising means for periodically increasing the pressure of said first liquid.

3. A system as in claim 1 or 2, further including sensing means for sensing an incipient presence of said first liquid in said second liquid.

4. A system as in claim 3, wherein said sensing means includes pressure determining means for determining an increased pressure of said first liquid which corresponds to said sensed incipient presence.

5. A system as in claim 3, wherein said sensing means includes a sensor operatively associated with said container means for outputting a signal in response to sensing said incipient presence of said first liquid in said second liquid.

6. A system comprising a test module including a number of microporous hollow fibers formed into loops, and means for determining a maximum pressure above which pressurized feed liquid within lumens of said microporous hollow fibers is expelled through pores of the fibers and into an essentially unpressurized extractant liquid substantially immiscible with the feed liquid, said means for determining said maximum pressure comprising:
    means for providing a source of said feed liquid;
    container means for holding said essentially unpressurized extractant liquid, wherein the loops of said hollow fibers are immersed in said essentially unpressurized extractant liquid;
    means for fluid-connecting said lumens at said opposing ends of said hollow fibers to said source of pressurized feed liquid; and
    means for allowing the pressure of said pressurized feed liquid to be periodically increased until an incipient presence of said pressurized feed liquid in said essentially unpressurized extractant liquid occurs, whereby said maximum pressure is determined.

7. In a liquid-liquid extraction system including a number of microporous hollow fiber membranes each of which defines an interior lumen, a feed liquid within the interior lumens of the membranes, and an extractant liquid on an exterior side of the membranes, the feed liquid being essentially immiscible with the extractant liquid, the improvement comprising means for detecting the presence of said substantially immiscible feed liquid in said extractant liquid, said means for detecting including means for sensing an optical property change in said extractant liquid, which optical property change is representative of the presence of said essentially immiscible feed liquid in said extractant liquid; means responsive to said sensed optical property change for outputting a signal; and means responsive to said outputted signal for indicating the presence of said essentially immiscible feed liquid in said extractant liquid.

8. In a liquid-liquid extraction system as in claim 7, the improvement wherein said means for detecting includes radiation source means for emitting radiation which passes through said extractant liquid, and radiation detecting means for detecting the radiation emitted by said source which passes through said extractant liquid.

9. In a liquid-liquid extraction system as in claim 8, the improvement wherein said radiation source means includes a light source, and said radiation detecting means includes a photodetector.

10. In a liquid-liquid extraction system as in claim 7, 8 or 9, the improvement wherein said means for indicating the presence of said essentially immiscible feed liquid in said extractant liquid includes means for issuing a visual and/or audible alarm.

11. A method of determining a maximum pressure above which a feed liquid is expelled through pores of a microporous hollow fiber, said method comprising the steps of:
 (a) forming a number of microporous hollow fibers into a loop between opposing ends thereof;
 (b) establishing fluid communication between central lumens of said hollow fiber loops and a pressurized source of said feed liquid;
 (c) immersing the loops of hollow fibers in an extractant liquid which is essentially immiscible with said feed liquid;
 (d) continually increasing the pressure of said feed liquid until there is an incipient presence of said feed liquid in said extractant liquid; and then
 (e) establishing the increased pressure at which said incipient presence of said feed liquid in said extractant liquid occurs thereby to determine said maximum pressure above which said feed liquid is expelled through the pores of said microporous hollow fibers.

12. A method as in claim 11, wherein the feed liquid includes a visible tracer, and wherein step (d) includes continually increasing the pressure of said feed liquid until an incipient visible presence of said tracer in said extractant liquid occurs.

13. A method for determining a maximum pressure differential across walls of microporous hollow fibers comprising:
 (a) immersing a number of loops of microporous hollow fibers in a first liquid;
 (b) fluid connecting each end of the hollow fiber loops with a pressurized source of a second liquid which is essentially immiscible with said first liquid;
 (c) continually increasing the pressure of said second liquid;
 (d) determining an incipient presence of said second liquid in said first liquid; and
 (e) establishing the increased pressure of said second liquid at which said incipient presence of second liquid occurs so as to determine said maximum pressure differential across the walls of said microporous hollow fibers.

14. A method as in claim 13, wherein the second liquid includes a visible tracer, and wherein step (d) is practiced by determining the incipient visual presence of said tracer in said first liquid.

15. In a liquid-liquid extraction method which includes providing a feed liquid within central lumens of a number of microporous hollow fiber membranes, and providing an extractant liquid on an exterior of said microporous hollow fiber membranes, the feed liquid being essentially immiscible with the extractant liquid, the improvement comprising detecting presence of said essentially immiscible feed liquid in said extractant liquid by (i) sensing an optical property change in said extractant liquid which is indicative of the presence of said essentially immiscible feed liquid in said extractant liquid, (ii) outputting a signal in response to said sensed optical property change, and (iii) providing an indication responsive to said outputted signal of the presence of said essentially immiscible feed liquid in said extractant liquid.

16. In a liquid-liquid extraction method as in claim 15, wherein the improvement of step (i) includes emitting radiation so that it passes through the extractant liquid, and detecting a change in a level of said radiation which passes through the extractant liquid.

17. In a liquid-liquid extraction method as in claim 15 or 16, wherein the improvement of step (iii) includes issuing a visual and/or audible alarm in response to receiving the outputted signal.

* * * * *